(12) United States Patent
Haverinen et al.

(10) Patent No.: US 7,142,520 B1
(45) Date of Patent: Nov. 28, 2006

(54) METHOD AND APPARATUS FOR MOBILE INTERNET PROTOCOL REGIONAL PAGING

(75) Inventors: Henry Haverinen, Tampere (FI); Jari T. Malinen, Mountain View, CA (US)

(73) Assignee: Nokia Mobile Phones Ltd., Espoo (FI)

( * ) Notice: Subject to any disclaimer, the term of this patent is extended or adjusted under 35 U.S.C. 154(b) by 1133 days.

(21) Appl. No.: 09/595,112

(22) Filed: Jun. 16, 2000

(51) Int. Cl.
*G08C 17/00* (2006.01)

(52) U.S. Cl. .................. 370/311; 370/330; 370/348

(58) Field of Classification Search ............... 405/433;
370/310–330, 335, 338, 340, 345, 350, 311,
370/503–512, 347
See application file for complete search history.

(56) References Cited

U.S. PATENT DOCUMENTS

| | | | | |
|---|---|---|---|---|
| 5,628,052 | A * | 5/1997 | DeSantis et al. | 455/562.1 |
| 5,710,975 | A | 1/1998 | Bernhardt et al. | |
| 5,745,852 | A * | 4/1998 | Khan et al. | 455/433 |
| 5,901,142 | A | 5/1999 | Averbuch et al. | |
| 6,223,035 | B1 * | 4/2001 | Pierce et al. | 455/433 |
| 6,542,716 | B1 * | 4/2003 | Dent et al. | 455/13.1 |
| 6,553,020 | B1 * | 4/2003 | Hughes et al. | 370/347 |
| 6,658,250 | B1 * | 12/2003 | Ganesan et al. | 455/426.1 |
| 6,671,500 | B1 * | 12/2003 | Damgaard et al. | 455/118 |
| 6,680,920 | B1 * | 1/2004 | Wan | 370/311 |
| 6,842,434 | B1 * | 1/2005 | Cook | 370/318 |

FOREIGN PATENT DOCUMENTS

WO        0022837        4/2000

OTHER PUBLICATIONS

C. Perkins, Editor, "IP Mobility Support", RFC 2002bis. Oct. 1996, pp. 1-79.

C. Perkins et al., "Mobile IP Regional Registration," Internet draft (work in progress), draft-ietf-mobileip-reg-tunnel-02.txt, Mar. 2000, pp. 1-27.

A. Campbell et al., "Cellular IP", Internet draft, draft-ietf-mobileip-cellularip-00.txt, Jan. 2000, pp. 1-22.

L. Li, "Paging Support for IP Mobility using HAWAII," Lucent Bell Labs, Internet draft, ietf-mobileip-paging-hawaii-00.txt, Jun. 1999, pp. 1-20.

C. Perkins, "IP Mobility Support for Ipv4," Internet draft, ietf-mobileip-rfc2002-bis-03.txt, Sep. 2000, pp. 1-94.

(Continued)

*Primary Examiner*—Chi Pham
*Assistant Examiner*—Phuc Tran (57) ABSTRACT

A mobile internet protocol regional paging network 10 includes a paging foreign agent for handling a regional registration of a mobile node visiting a paging area, which includes internet protocol subnetworks. In operation, the mobile node periodically can provide an idle mode request to the paging foreign agent to enter an idle mode so as to deactivate one or more components for energy-saving purposes and reduce active communication with the mobile internet protocol regional paging network. The invention provides a small and link-layer independent extension to Mobile Internet Protocol with Regional Registrations to support power-constrained operation in the mobile nodes and to reduce routing state information in the visited domain. The extension allows a Mobile Node to enter a power saving Idle Mode during which its location is known with the coarse accuracy defined by a Paging Area. The mobile node and the visited domain may optionally agree on time slots used for Agent Advertisements and paging. The mobile node 14 may include a mobile phone, a pager, or any telecommunications device capable of wireless communicating, including communication over the internet.

26 Claims, 6 Drawing Sheets

OTHER PUBLICATIONS

C. Perkins et al., "Mobile IP Regional Registration", Internet draft, ietf-mobileip-reg-tunnel-03.txt, Jul. 2000, pp. 1-33.

S. Bradner, "Key words for use in RFCs to Indicate Requirement Levels", RFC 2119, Harvard University, Mar. 1997, pp. 1-3.

C. Perkins et al., "Mobility Support in Ipv6", Internet draft, ietf-mobileip-ipv6-12.txt, Apr. 2000, pp. 1-109.

B. Adoba et al., "The Network Access Identifier", WorldCom Advanced Networks Jan. 1999, pp. 1-8.

C. Perkins et al., AAA Registration keys for Mobile IP, Internet draft, ietf-mobileip-aaa-key-01.txt, Jan. 2000, pp. 1-10.

S. Bradner, "The Internet Standards Process—Revision 3", BCP 9, RFC 2026, Oct. 1996 pp. 1-36.

J. Solomon et al., "Mobile-Ipv4 Configuration Option for PPP IPCP", FTP Software, RFC 2290, Feb. 1998, pp. 1-17.

3rd Generation Partnership Project; Technical Specification Group Core Network; Technical Report on Pre-paging (Release 1999), 3G TR 23.908 V3.0.1 (Mar. 2000), pp. 1-15.

3G TS 25.331 V3.2.0 (Mar. 2000), Release 1999, Section 8.1.2 "Paging", pp. 38-39.

La Porta, T.F. et al., "Mobile IP and Wide Area Wireless Data", WCNC. 1999 IEEE Wireless Communications and Networking Conference, Sep. 21-24, 1999, pp. 1528-1532 vol. 3.

Valko, A.G., "Cellular IP: A New Approach to Internet Host Mobility", Jan. 1999 pp. 50-65, vol. 29, No. 1, Computer Communications Review.

* cited by examiner

FIG. 4
(Advertisement Interval)

FIG. 5
(Paging Area ID Extension)

FIG. 6
(Idle Mode Request Extension)

FIG. 7
(Idle Mode reply Extension)

FIG. 9
(Paged Mobile Node Address Extension)

FIG. 8
(Paging Request Message)

METHOD AND APPARATUS FOR MOBILE INTERNET PROTOCOL REGIONAL PAGING

BACKGROUND OF THE INVENTION

1. Field of Invention

The present invention relates to a method and apparatus for implementing an internet protocol; and more particularly, to a method and apparatus for implementing an internet protocol in a regional registration paging network.

2. Description of Related Art

A network having mobile internet protocol with regional registration is known in the art. (See, C. Perkins, Editor, "IP Mobility Support", RFC 2002bis, March 2000, and C. Perkins et al., "Mobile IP Regional Registrations," Internet draft (work in progress), draft-ietf-mobileip-reg-tunnel-02.txt, March 2000.) The network has a hierarchy of one or more foreign agents for handling regional registrations of a mobile node visiting one or more internet protocol subnetworks. Paging support for mobile internet protocol is also known in the art. (See Cellular IP, draft-ietf-mobileip-cellularip-00.txt, and Hawaii Internet, draft-ietf-mobileip-paging-hawaii-00.txt.) Paging support enables mobile nodes that are not actively communicating to enter an idle mode in which the network does not need to know the exact location of the mobile node. When the network has data packets destined to an idle mode node, it pages the mobile node in order to learn the exact internet protocol subnetwork of the mobile node. Paging support can be also specified for mobile internet protocol with regional registrations.

One disadvantage of the prior art paging solutions is that the mobile node needs to be continuously operating and consuming battery power. The network-level protocol operation in the prior art either disregard the power-constrained operation, or assume that the link layer provides support for this kind of operation.

The network having mobile internet protocol with regional registrations known in the art does not address saving battery power.

SUMMARY OF INVENTION

The present invention provides an extension to a mobile internet protocol with regional registrations in order to support power-constrained operation and to reduce routing state information in the visited domain. The extension allows a mobile node to enter a power saving idle mode. In this mode, the visited domain does not know the location of an idle mobile node with the accuracy of an internet protocol subnetwork in a paging area, but instead with a more coarse accuracy of the paging area itself.

Foreign agents advertise paging support by including a paging area identification (ID) extension in agent advertisements. A mobile node that wishes to enter the idle mode sends a regional registration request with an idle mode request extension to the paging foreign agent of the current paging area. The paging foreign agent replies by including an idle mode reply extension to a regional registration reply. In the idle mode, the mobile node does not need to perform subsequent registrations when it moves between the internet protocol subnetworks of the paging area.

The mobile node enters the active mode by performing a normal regional registration. The network may also trigger this by paging the mobile node. The network pages the mobile node by sending an agent advertisement with a paged mobile node address extension to a paging multicast address.

When entering the idle mode, the mobile node may negotiate a time slot based paging scheme to be used with the network. In this case, the mobile node and the network agree on time slots used for agent advertisement and paging within the paging area.

In operation, the mobile node and the network can agree on the instant of time when the mobile node can be paged, and on the time instant that the network sends messages which the mobile node can use to deduce its current paging area. These time instants are expressed in relation to time instants when the periodic paging area advertisements are broadcast. Other embodiments are also possible, for example, the time instant could be expressed in relation to the current time of day, if the mobile node and the network have accurate and synchronized time of day clocks.

Another alternative embodiment would be to use some other message than the agent advertisement to advertise the current paging area. Here it is important that there is a periodic message that the mobile node can listen to in order to deduce its current paging area, and the time instant when this message is expected in the current paging area is known to the mobile node.

Essentially, when agreeing on the time instants of these time slots, the mobile node and the network express the time instants in relation to some time instant that they both know, such as the time instant of the periodic agent advertisements. For example, the mobile node and the network calculate these time instants using different parameters, such as a paging slot index, paging slot interval and paging slot offset for expressing the time instant of the paging slot.

Since power saving support is implemented on the network layer, it is link-layer independent.

The paging mechanism is based on standard Mobile IP protocols.

Paging messages are sent to a certain multicast address, which may allow the mobile node to perform hardware optimizations for power saving.

One advantage of the present invention is that the mobile node does not need to be continuously operating and consuming full-battery power. For example, when in the idle mode, the mobile node can intermittently turn off one or more components, such as its radio or receiver, to save battery power.

Another advantage of the present invention is that the mobile node does not need to register each time it moves between one or more internet protocol subnetworks of the paging area.

DETAILED DESCRIPTION OF INVENTION

Figure 1:
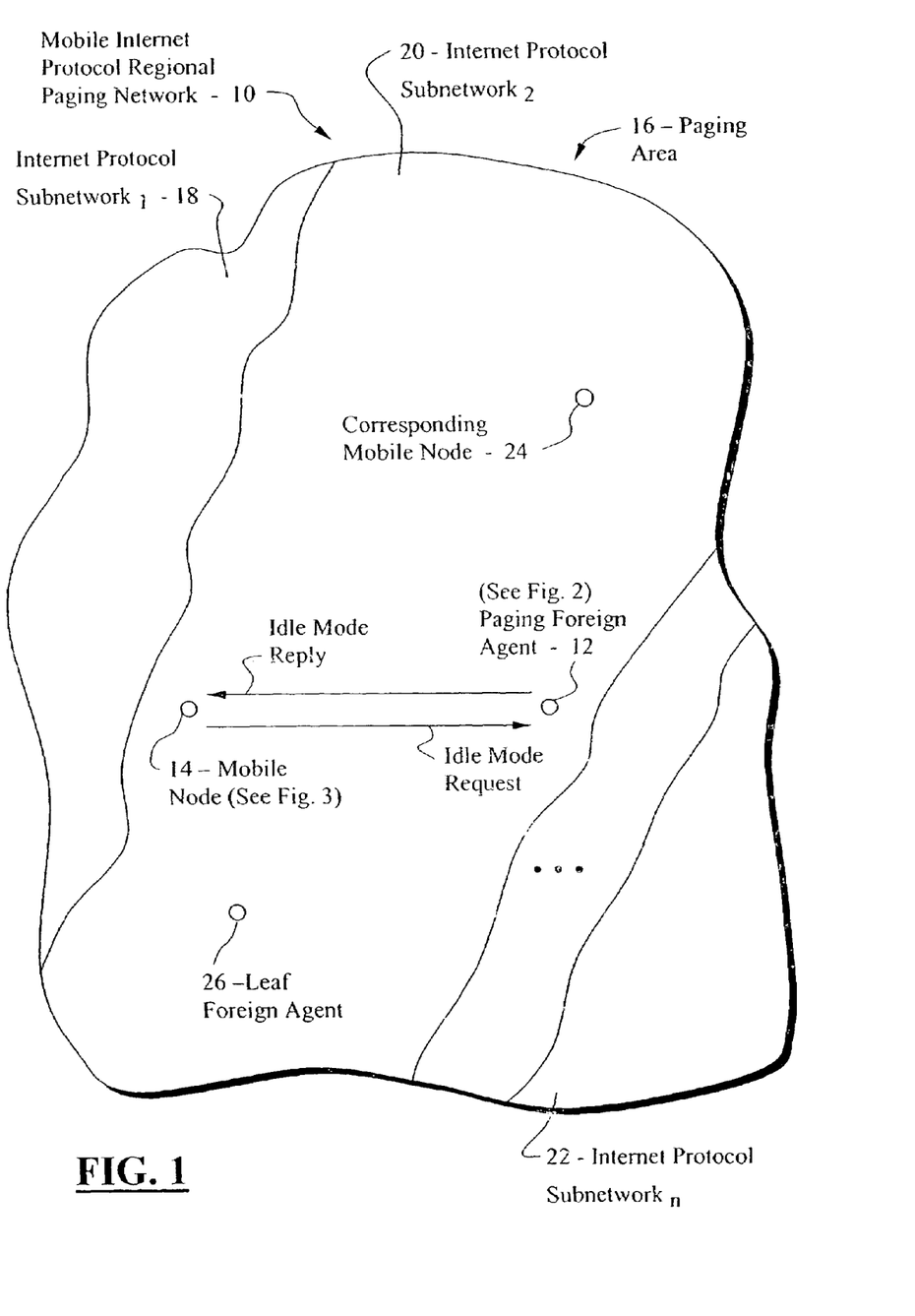
FIG. 1 is a block diagram of a mobile internet protocol regional paging network that is the subject matter of the present invention.

FIG. 1: The Basic Invention

FIG. 1 shows a Mobile Internet Protocol Regional Paging Network generally indicated as 10 having a Paging Foreign Agent 12 for handling a Regional Registration of a Mobile Node 14 visiting a Paging Area 16, which includes n Internet Protocol Subnetworks 18, 20, . . . , 22. The Paging Area 16 is an area that can contain multiple agents. The Foreign Agent at the root of the Paging Area 16 is known as the Paging Foreign Agent 12. (The visited domain is known in the art as a domain defined by a hierarchy of regional-aware foreign agents. This domain is usually administered by a single entity and can have secure localized signaling between the foreign agents in the domain. When a Mobile Node such as 14 stays inside one visited domain (and the home registration does not expire), the Mobile Node such as 14 does not need to do home registrations but can use Regional Registrations, discussed below, to get a fast response from the localized location management.) In the present invention, the Mobile Node 14 may include a mobile phone, a pager, or any telecommunications device capable of wireless communication, including communication over the internet.

The Mobile Node 14 may periodically provide an idle mode request to the Paging Foreign Agent 12 to enter an idle mode so as to deactivate one or more components for energy-saving purposes and reduce active communication with the Mobile Internet Protocol Regional Paging Network 10.

According to the present invention, the Mobile Node 14 negotiates a time slot based paging scheme with the Paging Foreign agent 12. The time slot based paging scheme includes time slots used for paging area advertisements and paging within the paging area. Time instant may be expressed in relation to a current time of day, if the mobile node and the visited-domain agent have accurate and synchronized time of day clocks. Alternatively, time instants may be expressed in relation to some time instant that the mobile node and the visited-domain agent both know, including time instants when periodic paging area advertisements are broadcast. When the mobile node 14 is in the Idle Mode, the network 10 knows its location with a smaller precision than usual, at a specified level defined by the Paging Area 16. In the Idle mode, the Mobile Node 14 deactivates one or more of its components, such as its radio or receiver, for energy-saving purposes to conserve battery power. As discussed herein, an Idle Mobile Node is a mobile node that is in the Idle Mode.

The invention is shown and described in relation to a mobile internet protocol regional paging network 10, but the scope of the invention is intended to include any kind of paging network.

Moreover, the present invention is shown and described using terms from the internet protocol version 4 (IPv4), such as "Foreign Agent", "Paging Foreign Agent", as well as "Agent Advertisements", as discussed below. However, the more generic term "visited domain mobility agent" may also be used in exchange for the terms "Foreign Agent" or "Paging Foreign Agent"; and the term "Network-layer Advertisement", "Paging Area Advertisement," or "Router Advertisement" may also be used in exchange for the term "Agent Advertisement." These alternative terms are not terms of art presently being used to define any particular version of the internet protocol. In view of this, and regardless of whether the terms of the internal protocol change in the future, it is important to note that the scope of the present invention is not intended to be limited to any particular version of the internet protocol. For example, the scope of the present invention is intended to include the Internet Protocol version 6 (IPv6), which is the next generation internet protocol at the time of filing this patent application.

Figure 2:
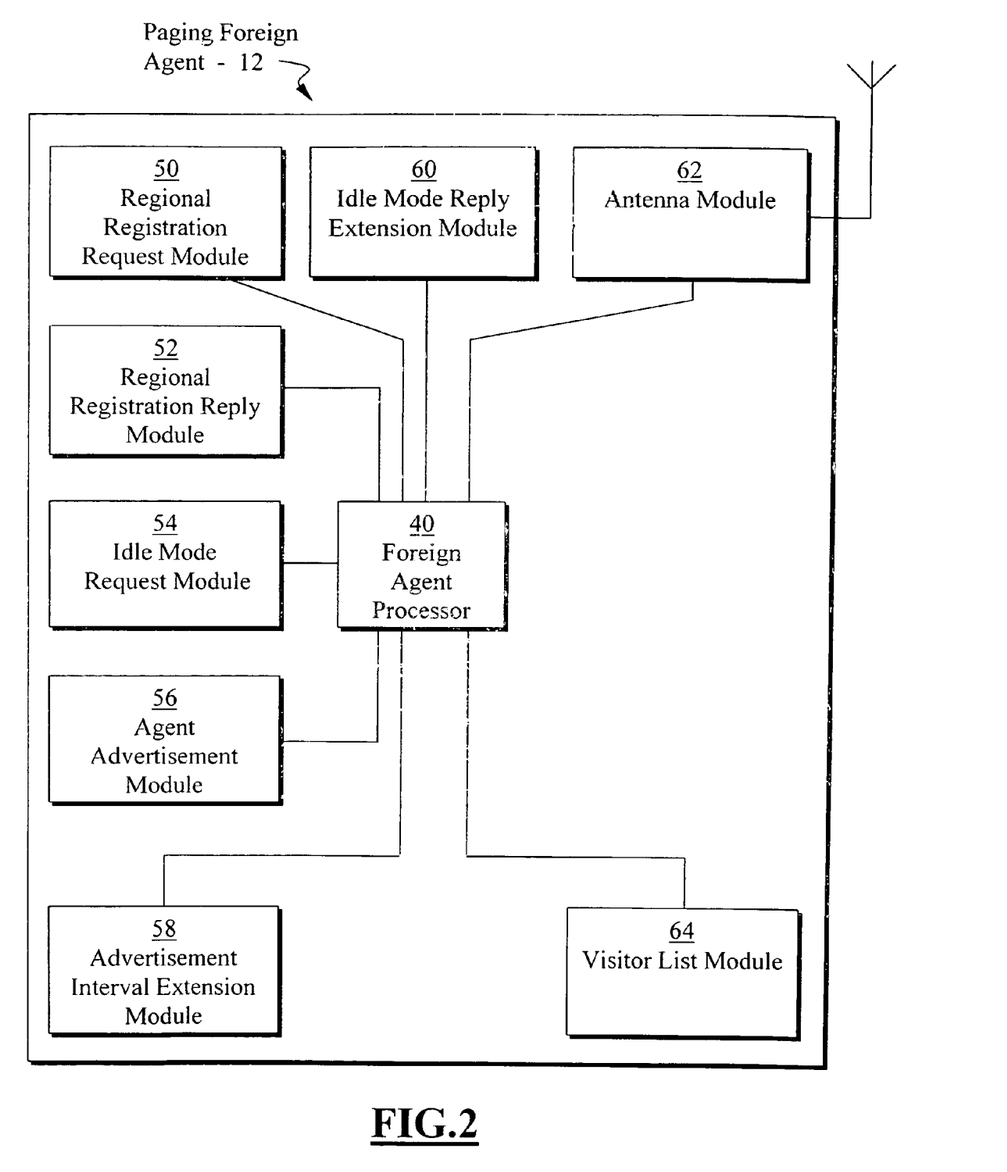
FIG. 2 is a block diagram of a paging foreign agent of the mobile internet protocol regional paging network shown in FIG. 1.
Figure 3:
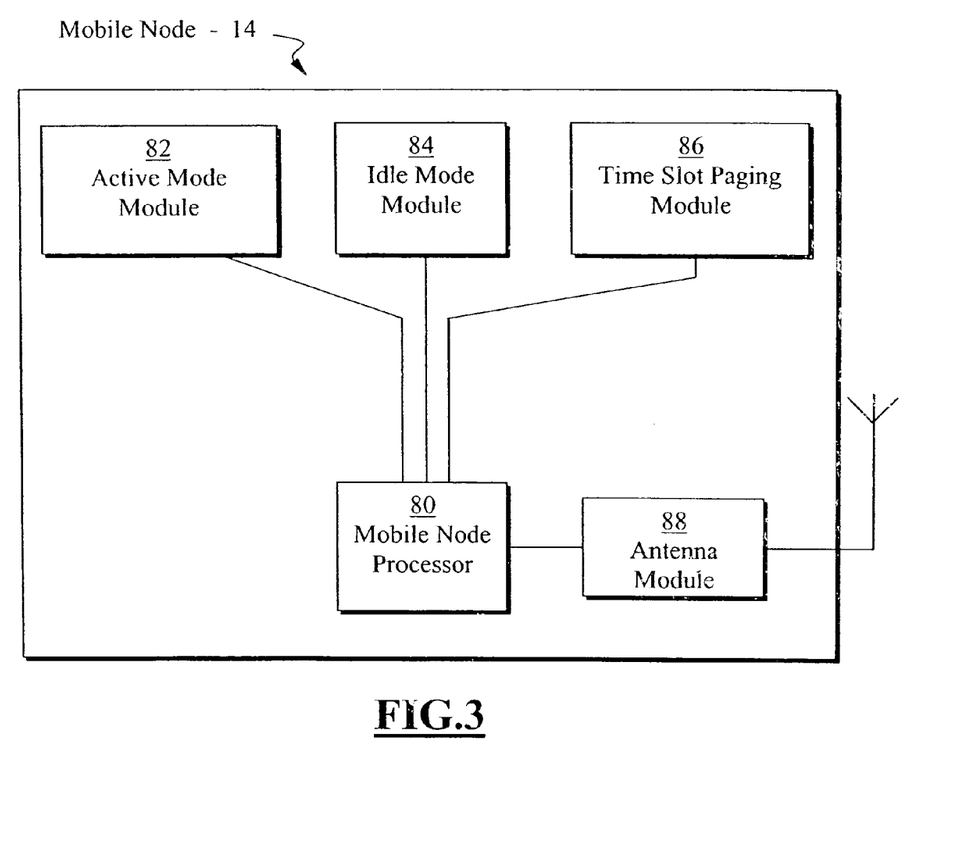
FIG. 3 is a block diagram of a mobile node of the mobile internet protocol regional paging network shown in FIG. 1.

FIGS. 2 and 3: Paging Foreign Agent 12 and Mobile Node 14

FIG. 2 shows the Paging Foreign Agent 12, which includes, among other elements, a Foreign Agent Processor 40, a Regional Registration Request Module 50, a Regional Registration Reply Module 54, an Idle Mode Request Module 54, an Advertisement Module 56, an Advertisement Interval Extension Module 58, an Idle Mode Reply Extension Module 60, an Antenna Module 62 and a Visitor List Module 64, all of which may be implemented using hardware, software or a combination thereof. The Paging Foreign Agent 12 may include other elements which are known in the art and do not need to be shown or described in order to appreciate and understand the present invention.

FIG. 3 shows the Mobile Node 14, which includes, among other elements, a Mobile Node Processor 80, an Active Mode Module 84, a Paging Slot Paging Module 86 and an Antenna Module 88, all of which may be implemented using hardware, software or a combination thereof. The Mobile Node 14 may include other elements which are known in the art and do not need to be shown or described in order to appreciate and understand the present invention, including a keyboard, a screen, etc.

A person skilled in the art could implement any one of the components in the Paging Foreign Agent 12 or the Mobile Node 14, for example, as a typical software embodiment which may include a microprocessor based architecture having a processor, memory, input/output devices and an address, control and data bus for connecting the same, driven by a computer program. The scope of the invention is not intended to be limited to any particular implementation of the components that make up the Paging Foreign Agent 12 and the Mobile Node 14, and a person skilled in the art could implement the same without undue experimentation.

The Foreign Agent Processor 40 and Mobile Node Processor 80 provide control and processing functions. Otherwise, the basic operation of the Paging Foreign Agent 12 and the Mobile Node 14, as well as the aforementioned components therein, are described below in relation to the exchange of the information between the Paging Foreign Agent 12, the Mobile Node 14, a Corresponding Mobile Node 24 and a Leaf Foreign Agent 26, in relation to FIGS. 3–9.

In the patent application, the various modules in FIGS. 2 and 3 are shown by way of example. The scope of the invention is not intended to be limited to any particular function being performed by any particular module. For example, the functions described below in relation to the active mode module 82, the idle mode module 84 and the time slot paging module 86 in the mobile node 14 of FIG. 2 could be performed in a single module, instead of multi-modules. Similarly, the functions described below in relation to the Paging Foreign Agent 12 could be performed in a single module, instead of multi-modules.

The Paging Foreign Agent 12

In the network 10, the Paging Foreign Agent 12 is a foreign agent that maintains the paging state in the Paging Area 16. Downlink communication paths to idle mobile nodes such as 14 within this Paging Area 16 terminate in this foreign agent. In the foreign agents closer to the Mobile Node 14 in the hierarchy, that is, below this node, there is no need to maintain any communication state information for idle mobile nodes.

The Leaf Foreign Agent 26

The Leaf Foreign Agent 26 is a foreign agent in a regional mobility hierarchy closest to the Mobile Node such as 14. This is usually a leaf of a tree structure of foreign agents within the Visited Domain. In FIG. 1, the Foreign Agent closest to the Mobile Node 14 is the Paging Foreign Agent 12. The visited domain can contain anything from zero to as many Paging Areas as there are Foreign Agents such as 12 in a visited domain. However, a subtree of a Paging Foreign Agent such as 12 must belong to the same Paging Area such as 16.

1. Protocol Operation

The following is a description of a protocol operation of the present invention:

1.1 Paging Area Discovery

In FIG. 1, the Paging Foreign Agent 12 (acting as a Leaf Foreign Agent similar to agent 26) advertises paging support with the Agent Advertisement Module 56, which provides an Agent Advertisement having a Paging Area ID Extension, which is discussed in more detail below in relation to FIG. 5. (As discussed below, a Leaf Foreign Agent send periodic unsolicited Agent Advertisements similar to a standard mobile internet protocol, either to the limited broadcast address or the "all hosts" multicast address. When the network pages an idle mobile node, the Leaf Foreign agents send an Agent Advertisement to a paging multicast address and include the paged mobile node address extension. The Mobile Node 14 detects its current Paging Area 16 based on the Paging Area ID extension. If the Agent Advertisement contains a Foreign Agent Network Access Identifier (FA NAI) extension, the Mobile Node 14 uses the pair (the Paging Area ID extension, the realm part of the FA NAI extension) as an identifier for the Paging Area 16. In the network 10, a typical Mobile Node such as 14 considers two foreign agents to belong to the same Paging Area only if the foreign agents advertise the same Paging Area ID extension, and either both the foreign agents advertise the FA NAI extension with the same realm part or neither of the foreign agents advertise the FA NAI extension.

FA NAI extensions are known art. A foreign agent may include an FA NAI extension in its agent advertisements. The FA NAI uniquely identifies the foreign agent. Mobile nodes such as 14 can use the realm part of the foreign agents' NAI to deduce whether they have moved to a new visited domain. (The format of NAI is "user@realm", like an e-mail address.) In order to limit the size of agent advertisement, in the present invention a short paging Area ID is used instead of the Paging Area NAI. Because the ID is short, it may not be globally unique and thus two paging areas may use the same ID. In this case, since the advertisements may contain the FA NAI, a mobile node can use the realm part of the FA NAI together with the paging area ID to deduce the paging area it is in. The scope of the invention is intended to include using an NAI for identifying paging areas as well.

When an idle mobile node such as 14 detects that it has moved to a new Paging Area such as 16, it must either perform a normal regional registration with the Active Mode Module 82 (FIG. 3) or an Idle Mode registration with the Idle Mode Module 84 (FIG. 3).

The Advertisement Interval Extension Module 58 (FIG. 2), as well as the Idle Mode Reply Extension Module 60 (FIG. 2), of the Paging Foreign Agent 12 (FIG. 1) cooperates with the Time Slot Paging Module 86 of the Mobile Node 14 to negotiate a time slot based paging scheme between the Paging Foreign Agent 12 and the Mobile Node 14, who agree on time slots used for agent advertisement and paging within the Paging Area 16. In this case, the Agent Advertisement may contain an Advertisement Interval Extension which specifies a time interval between successive unsolicited Agent Advertisements, typically in milliseconds. The Advertisement Interval Extension is shown and described in more detail in relation to FIG. 4. An Advertisement Interval Extension with non-zero Slot Length field indicates support for time slot based paging within the Paging Area 16. A time slot during which an idle mobile node activates its receiver to be able to receive the possible paging Agent Advertisements sent by the Leaf Foreign Agents such as 26 in the Paging Area 16. In the time slot based paging case, the Leaf Foreign Agents 26 of the Paging Area 16 send Agent Advertisements simultaneously with the same advertisement interval. A new field in the Advertisement Interval Extension indicates the length of the Advertisement Slot in milliseconds. The Advertisement Slot is the time during which the advertisement is expected. This allows foreign agents with overlapping cells to send their advertisements at slightly different times in order to avoid interference.

The Paging Area 16 typically has a mechanism for synchronizing the clocks of the foreign agents. Such a mechanism is known in the art and not described herein.

If the time slot based paging scheme is used, a mobile node such as 14 that is in the Idle Mode may power on its receiver in the Antenna Module 88 when an unsolicited Agent Advertisement or a Paging Agent Advertisement is expected and keep its receiver powered off at other times. In other words, an Advertisement Time Slot is a slot during which an idle mobile node activates its receiver to be able to receive the periodical unsolicited Agent Advertisements sent by the Leaf Foreign Agent 26 in the Paging Area 16. The Mobile Node 14 does not have to power on its radio or receiver for every Agent Advertisement but it may power on its receiver only for every Nth expected Agent Advertisement, where N can be freely picked by the Mobile Node 14. The deactivation of the receiver in the Antenna Module 88 for energy-saving purposes conserves battery power in the Mobile Node 14. If the Mobile Node 14 does not receive an agent Advertisement during the Advertisement Slot, whether due to leaving the paging area or due to clock skew, it should send an Agent Solicitation and keep its receiver powered on until it receives an Agent Advertisement.

1.2 Entering the Idle Mode

When the Mobile Node 14 is sending or receiving data packets, it is in an Active Mode. For the purposes of describing the present invention, the Active Mode Module 82 of the Mobile Node 14 cooperates with the Regional Registration Request Module 50 of the Paging Foreign Agent 12 to perform functions related to the operation and registration of the Mobile Node 14 in the Active Mode in the network 10. These functions are known in the art and not described in detail herein, and include entering the active mode when the Mobile Node 14 first enters the paging area, as well as entering the active mode after the Mobile Node is in the Idle Mode. By way of example, when the Mobile Node 14 is in the Active Mode, it operates as normally with regional registrations. In order to send or receive packets, the Mobile Node 14 must be in the Active Mode. In other words, when the Mobile Node 14 is in the Active Mode, the operation is exactly the same as in the Mobile IP with Regional Registrations, which is known in the art.

However, when the Mobile Node 14 is not actively communicating, it can enter the Idle Mode. For the purposes of describing the present invention, the Mobile Node Processor 80, the Idle Mode Module 84 and the Time Slot Paging Module 86 cooperate to perform functions for the Mobile Node 14 in order to enter the Idle Mode. When the Mobile Node 14 is in the Idle Mode, the visited domain does not know the exact location of the Mobile Node 14. The visited domain only knows the Paging Area 16 of the idle mobile node such as 14.

When the Mobile Node 14 enters the Idle Mode, the Idle Mode Module 84 performs an Idle Mode registration by sending a Regional Registration Request with an Idle Mode Request Extension. In effect, the Idle Mode Registration is a regional registration performed by the Mobile Node 14 in order to enter the Idle Mode or to extend the lifetime of a previous Idle Mode Registration. The Idle Mode Request extension is shown and described in more detail below in relation to FIG. 6.

Figure 6:
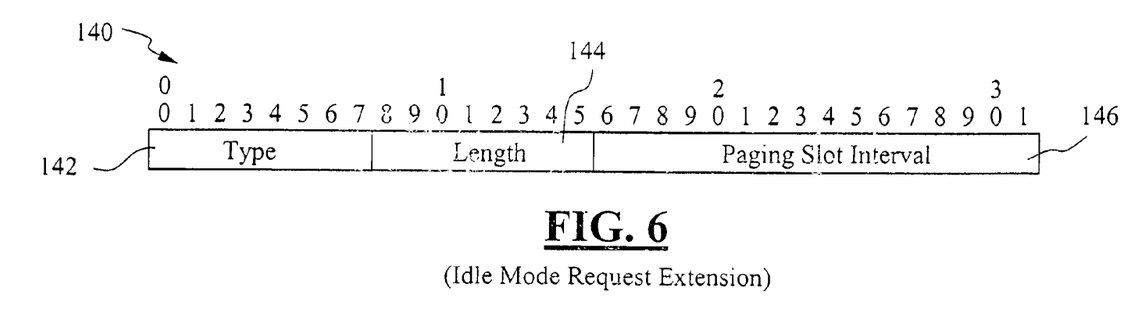
FIG. 6 is a diagram of an idle mode request extension sent from a mobile node to a paging foreign agent in FIG. 1 when the mobile node to enter an idle mode.

As discussed below, if time slot based paging is used, the Time Slot Paging Module 86 provides the Idle Mode Request Extension with the Paging Slot Interval expressed as a multiple of advertisement intervals.

When the Paging Foreign Agent 12 receives the Regional Registration Request with the Idle Mode Request Extension (FIG. 6), the Idle Mode Request Module 54 processes the request, and the Visitor List Module 64 adds the Mobile Node 14 to a Visitor List stored in a memory (not shown) and marks its mode as Idle. The entry in the Visitor List is otherwise maintained as normal entries in regional Registrations, but the Paging Foreign Agent 12 does not have any tunnels or other routing information for the Mobile Node 14 in its routing table. The operation of the Paging Foreign Agent 12 upon receipt of a data packet destined to an idle Mobile Node is specified below in Section 1.3. Foreign agents closer to the Mobile Node 14 in the hierarchy do not need to maintain any state specific to the Mobile Node 14. If a Crossover Foreign Agent is above the Paging Foreign Agent 12 in the hierarchy, it also receives the Regional Registration Request and updates its state as normally in regional registrations. (When a Mobile Node is performing a Regional Registration, a Crossover Foreign Agent is typically a foreign agent where the old path of tunnels leading to a Mobile Node and the new path cross, i.e. the foreign agent in the hierarchy where a change in the tunneling or routing information is needed in order to keep the communication path to the Mobile Node up-to-date.)

As is understood in the art, the Mobile internet protocol normally uses internet protocol tunneling to deliver the mobile node's packets to the current location of the mobile node. For example, a Foreign Agent in a network that supports regional registrations may use internet protocol tunneling to forward mobile node destined packets to a lower foreign agent. When a packet is tunneled to a remote location, it is encapsulated in another packet by inserting a new outer header. The destination address in the outer header tells the exit point of the tunnel. At the tunnel exit point, the packet is decapsulated by removing the outer header.

The Idle Mode Reply Extension Module 60 in the Paging Foreign Agent 12 provides an Idle Mode Reply Extension in a Regional Registration Reply to the Mobile Node 14. The reply contains a Paging Multicast Address, which is used for paging a Mobile Node by any Leaf Foreign Agents such as 26, or by the Paging Foreign Agent 12 for paging the Mobile Node 14. When a Mobile Node such as 14 is paged, each Leaf Foreign Agent 12 or 26 sends the Agent Advertisement to this address with the Paged Mobile Node Address extension indicating which Mobile Node is being paged. Such advertisements are called paging Agent Advertisements. A Paging Multicast Address can be used for paging one or Mobile Nodes. One or more Leaf Foreign Agent 26 of the paging area 16 can use this address for paging the Mobile Node 14 when they receive a Paging Request from the Paging Foreign Agent 12.

According to the present invention, if the time slot based paging scheme is used, the Idle Mode Reply Extension may contain a Paging Slot Index (an integer) and a Paging Slot Offset (milliseconds). See FIG. 7. The Paging Slot instant is determined as follows. The slot has its center point N milliseconds after the reception of an Agent Advertisement with Sequence Number modulo the Paging Slot Interval equal to zero, where N equals Paging Slot Index times Advertisement Interval plus Paging Slot Offset. The slot has a length equal to the length of the Advertisement Slot.

In operation, the Mobile Node 14 and the Paging Foreign Agent 16 can agree on the instant of time when the Mobile Node 14 can be paged, and on the time instant that the Paging Foreign Agent 16 sends messages which the Mobile Node 14 can use to deduce its current paging area. These time instants are expressed in relation to the periodical agent advertisements. Other embodiments are also possible, for example, the time instant could be expressed in relation to the current time of day, if the Mobile Node 14 and the Paging Foreign Agent 16 have accurate and synchronized time of day clocks.

Another alternative embodiment would be to use some other message than the agent advertisement to advertise the current paging area. Here it is important that there is a periodic message that the Mobile Node 14 can listen to in order to deduce its current paging area, and the time instant when this message is expected in the current paging area is known to the Mobile Node 14.

However, the scope of the invention is not limit to the details of agreeing on the paging area advertisement time instants and the paging time instants. Essentially, when agreeing on the time instants of these time slots, the Mobile Node 14 and the Paging Foreign Agent 16 express the time instants in relation to some time instant that they both know, such as the time instant of the periodical agent advertisements. For example, the Mobile Node 14 and the Paging Foreign Agent 16 calculate these time instants using different parameters, such as a paging slot index, a paging slot interval and a paging slot offset for expressing the time instant of the paging slot. Other parameters and ways for determining these time instants may also be used.

1.3 Paging

When the paging Foreign Agent 12 receives a packet from the correspondent Node 24 destined for the Mobile Node 14 that is in the Idle Mode (i.e. an Idle flag set), the Paging Foreign Agent 12 does not forward the packet to any lower foreign agent. Instead, the Paging Foreign Agent 12 sends a Paging Request to its child Foreign Agents which forward the message to their child Foreign Agents recursively. The Agent Advertisement Module 56 of the Leaf Foreign Agent 26 sends a paging message containing an identifier of the Mobile Node 14, such as, for example, an Agent Advertisement to the Mobile Node 14 using the Paging Multicast Address. The Agent Advertisement would contain a Paged Mobile Node Address Extension which identifies the target among the Mobile Nodes 14 listening to this Paging Multicast Address. When the time slot based paging scheme is supported, the Paging Request contains the Paging Slot Interval, the paging Slot Index, and the Paging Slot Offset.

The one or more Leaf Foreign Agents 26 send an Agent Advertisement with a Paged Mobile Node Address Extension to the paging Multicast Address of the Mobile Node 14. Besides the Paged Mobile Node Address extension, the Leaf Foreign Agent 26 includes the same extensions that it normally includes in solicited Agent Advertisements.

When the time slot based paging scheme is used, the one or more Leaf Foreign Agents 26 send the paging Agent Advertisement during the Paging Slot of the Mobile Node 14.

The Mobile Node 14 is expected to perform a Regional Registration in response to an advertisement used for paging. The Paging Foreign Agent 12 may retransmit the Paging Request after a timeout. If the Mobile Node 14 has not performed a regional registration after a small number of retransmissions, the Paging Foreign Agent 12 should send a Destination Unreachable ICMP message to the correspondent node.

While waiting for the response of the Mobile Node 14, the Paging Foreign Agent 12 may buffer the data destined to the Mobile Node 14. When the Mobile Node 14 has done a Regional Registration, the paging Foreign Agent 12 can stop buffering and forward the buffered packets to the Mobile Node. The Paging Foreign Agent 12 discards buffered packets after a timeout.

1.4 Entering Active Mode

When the Mobile Node 14 receives an Agent Advertisement to its Paging Multicast Address and the advertisement contains the address of the Mobile Node 14 in the Idle Mobile Node Address Extension, the Mobile Node 14 enters the Active Mode. The Mobile Node 14 can also enter the Active Mode if it needs to send a packet.

When entering the Active Mode, the Active Mode Module 82 of the Mobile Node 14 sends a Regional Registration Request to the Paging Foreign Agent 12. The Regional Registration Request Module 50 and Visitor List Module 64 change the state of the visited domain of the Mobile Node 14. This registration clears the Idle Mode in the Paging Foreign Agent 12 and allows all subsequent data to reach the Mobile Node 14.

2. Protocol Extensions

By way of example, protocol extensions of the present invention are shown and described in more detail below.

2.1 Advertisement Interval Extension

Figure 4:
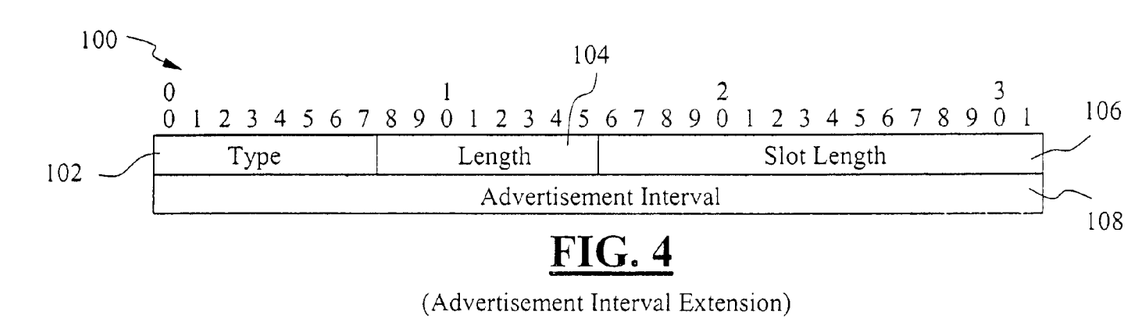
FIG. 4 is a diagram of an advertisement interval extension which may be part of an agent advertisement sent from a paging foreign agent to a mobile node in FIG. 1.

FIG. 4 shows the Advertisement Interval extension generally indicated as 100. An Advertisement Interval option is used in Router Advertisement messages to advertise the interval at which the sending router sends unsolicited multicast Router Advertisements. The regional paging support uses the format of this option in a skippable extension to the unsolicited IPv4 Agent Advertisement, with an additional Slot Length field.

The Advertisement Interval extension 100 includes a type field 102, a length field 104, a slot length field 106 and an advertisement interval field 108.

The Type field 102 is skippable. As is understood in the art, a skippable type field means that the type number constant should be allocated from the "skippable" range. If a mobile internet protocol entity receives a message with an extension that it does not recognize and the type number is from the skippable range, the mobile internet protocol should ignore the extension and continue processing the message. Non-skippable extensions, on the other hand, must not be skipped but the message must be silently discarded if the message is an unrecognized non-skippable extension.

In FIG. 4, the Length field 104 is an 8-bit unsigned integer. The length of the option, excluding the type and length fields, is in octets. The value of this field must be 6.

In FIG. 4, the Slot Length field 106 is 16-bit unsigned integer, which indicates the time, in milliseconds, for the Agent Advertisement slot during which the Paging Foreign Agent 12 sends the Agent Advertisement, if slot-based paging is supported. When the unsolicited Agent Advertisements are transmitted once in an Advertisement Interval, the non-zero Slot Length tells that the maximum phase variation of the advertisement from the average is half of the Slot Length milliseconds. This can be used to introduce time randomness to the Agent Advertisements within a limited range.

If the Slot Length 106 is non-zero, the Agent Advertisement must also include a Paging Area NAI extension.

If the Slot Length 106 is zero, it indicates that the Paging Area 16 does not support time slot-based paging.

The Slot Length 106 also specifies the length of the paging slot within the Paging Area 16 (FIG. 1).

The Advertisement Interval field 108 is 32-bit unsigned integer. The maximum time, in milliseconds, between successive unsolicited router Agent Advertisement messages sent by this foreign agent on this network interface.

2.2 Paging Area ID Extension

Figure 5:
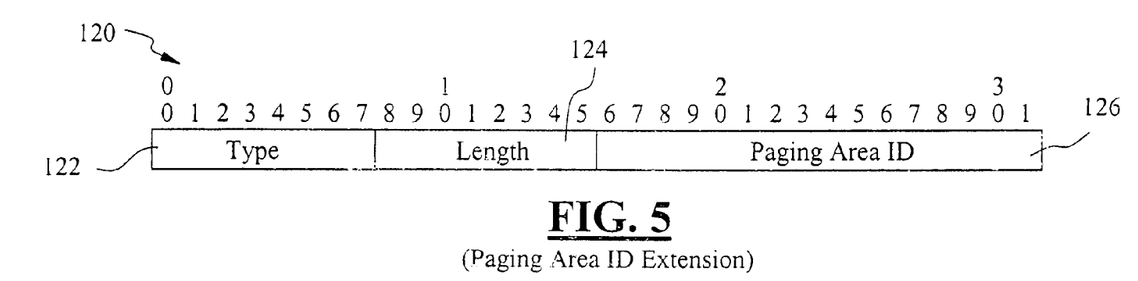
FIG. 5 is a diagram of a paging area identification (ID) extension which is part of an agent advertisement sent from a paging foreign agent to a mobile node in FIG. 1.

FIG. 5 shows the Paging Area ID extension generally indicated as 120, which includes a Type field 122, a Length field 124, a Paging Area ID Extension field 126.

The Type field 102 is skippable.

In FIG. 5, the Length field 104 is the number of octets in the Paging Area ID extension field. the Paging Area ID Extension field 126 is a 16-bit identifier. The Paging Foreign Agent 12 that supports regional paging indicates the support by including its Paging Area ID extension in the Agent Advertisement message. (All the foreign agents in the paging area advertise the paging support, not just the paging foreign agent.) If present, the Paging Area ID extension must appear in the Agent Advertisement message after any of the advertisement extensions as defined in and consistent with the protocol known in the art.

2.3 Idle Mode Request Extension

FIG. 6 shows the Idle Mode Request extension generally indicated as 140, which includes a Type field 142, a Length field 144 and a Paging Slot Interval field 146.

The Type field 142 is skippable.

The length field 144 is the length of the fields, excluding the Type and the Length fields, in octets. If the Mobile Node requests time slot-based paging, the length equals to 2, else the length equals to zero.

The Paging Slot Interval field 146 is an optional field that contains a 16-bit unsigned integer. If the Mobile Node 14 requests time slot-based paging, the Paging Slot Interval field 146 is used for determining the Mobile Node's paging slot, as specified in Section 1.2.

2.4 Idle Mode Reply Extension

Figure 7:
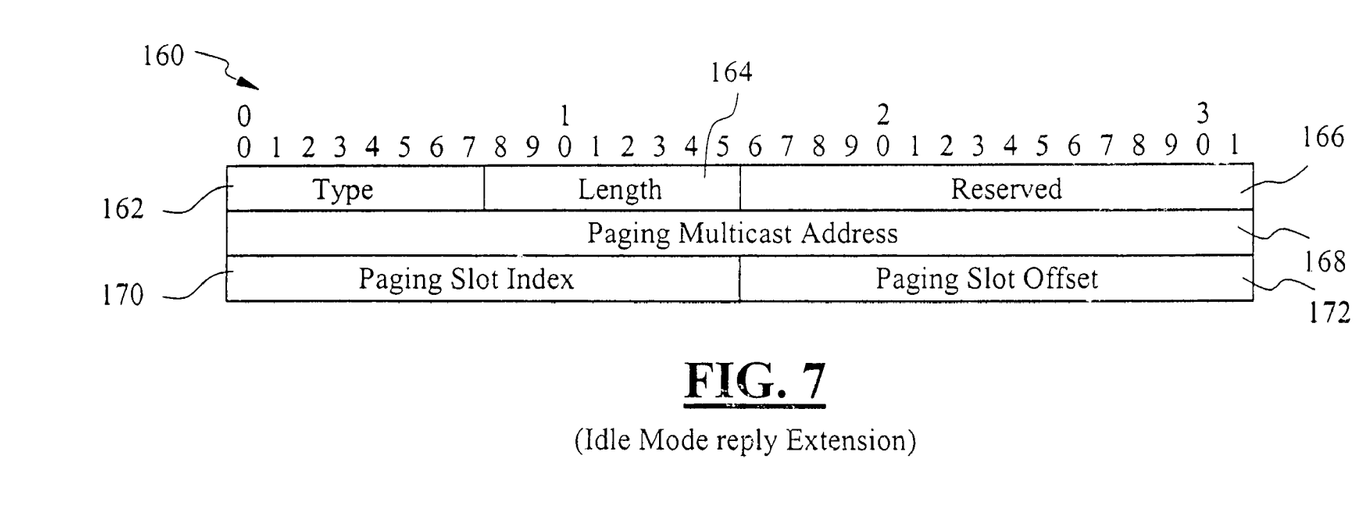
FIG. 7 is a diagram of an idle mode reply extension sent from a paging foreign agent to a mobile node in FIG. 1 in response to the idle mode request extension shown in FIG. 6.

FIG. 7 shows the Idle Mode Reply extension generally indicated as 160, which includes a Type field 162, a Length field 164, a Reserved field 166, a Paging Multicast Address field 168, a Paging Slot Index field 170 and a Paging Slot Offset field 172.

The Type field 142 is skippable.

The Length field 164 is the length of the fields excluding the Type and the Length fields, in octets. If time slot-based paging is used, the length equals to 10, else the length equals to 6.

The Reserved field 166 is unused. It must be initialized to zero by the sender and must be ignored by the receiver.

The Paging Multicast Address field 168 is an IP address used for paging the Mobile Node 14. If the Correspondent Node 24 sends a datagram to the Mobile Node 14 while the Mobile Node 14 is in the Idle Mode, the network 10 pages the Mobile Node 14 by sending a paging Agent Advertisement to this multicast address. The Paging Foreign Agent 12 can decide how to assign these addresses.

The Paging Slot Index field 170 is an optional field that contains a 16-bit unsigned integer. If time slot-based paging is supported, the Paging Slot Index is used for determining the Mobile Node's paging slot, as specified in Section 1.2.

The Paging Slot Offset field 172 is also an optional field that contains a 16-bit unsigned integer. If time slot-based paging is supported, the Paging Slot Offset is used for determining the Mobile Node's paging slot, as specified in Section 1.2.

2.5 Paging Request Message

Figure 8:
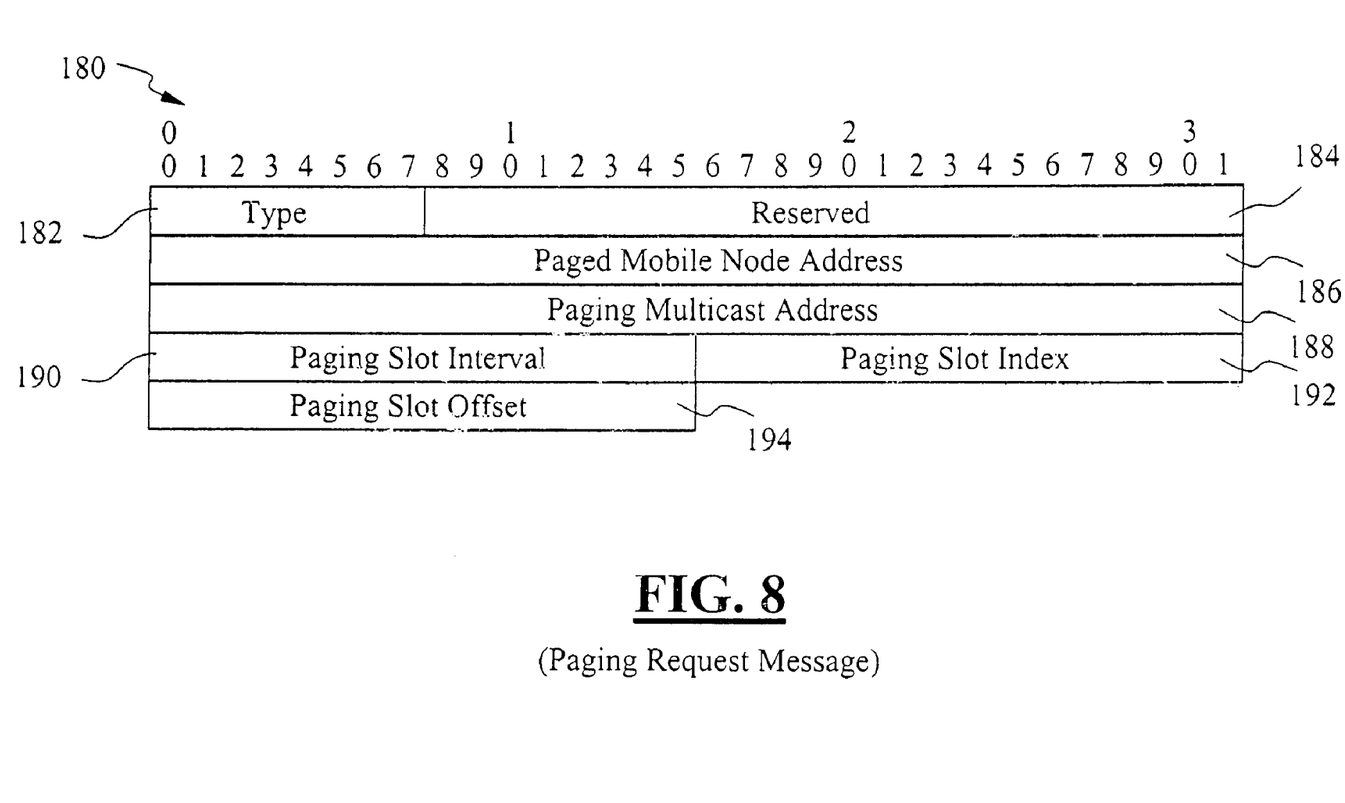
FIG. 8 is a diagram of a paging request message sent from a paging foreign agent to a mobile node in FIG. 1 in order to page the mobile node.

FIG. 8 shows the Paging Request Message generally indicated as 180, which includes a Type field 182, a Reserve field 184, a Paged Mobile Node Address field 186, a Paging Multicast Address field 188, a Paging Slot Interval field 190 a Paging Slot Index field 192 and a Paging Slot Offset field 194.

When paging a Mobile Node such as 14, the Paging Foreign Agent 12 sends the Paging Request Message to its descendants in the Paging Area 16 (FIG. 1). The recipients of this message that have active interfaces capable of serving Mobile Nodes such as 14 then send a paging Agent Advertisement to those interfaces in order to page the Mobile Node 14.

The Paging Request message 180 is a UDP packet to the user datagram protocol (UDP) Port 434. (The user datagram protocol is a transport layer protocol that runs on top of the internet protocol.) The Paging Request message 180 contains the addresses of the paged Mobile Node and optionally parameters for calculating the point of time when to page the Mobile Node.

The IP fields include a Source Address field and a Destination Address field. The Source Address field is typically the interface address from which the message is sent. The Destination Address field is the address of lower foreign agent.

The UDP fields include a Source Port field and a Destination Port field. The Source Port field is variable. The Destination Port field is a 434 port. (As is known in the art, the UDP protocol uses port numbers to identify the receiving process on the receiving host. The port number 434 has been reserved for mobile internet protocol, so the mobile internet protocol process receives UDP packets that are sent to port 434.)

FIG. 8 shows the UDP header which is followed by Paging Request fields.

The Paging Request fields can be followed by a Foreign-Foreign Authentication extension.

The Type field 182 is allocated from the mobile internet protocol message numbering space.

The Reserved field 184 is unused. It must be initialized to zero by the sender and must be ignored by the receiver.

The Paged Mobile Node Addresses field 186 is the IP home address of the Mobile Node that is the target of paging. For efficiency reasons, there may be more than one Mobile Node address listed in this field.

The Paging Multicast Address field 188 is an IP multicast address used for paging the Mobile Node. In the Idle Mode the Mobile Node listens to this address for the agent advertisements which indicate paging of the Mobile Node by the network.

The Paging Slot Interval field 190 is a 16-bit unsigned integer. The interval between two successive paging slots, in multiples of advertisement intervals. If time slot-based paging is not used, this field must be set to zero.

The Paging Slot Index field 192 is a 16-bit unsigned integer. A parameter used for determining the Mobile Node's paging slot, as specified in Section 1.2. If time slot-based paging is not used, this field must be set to zero.

The Paging Slot Offset field 194 is a 16-bit unsigned integer. A parameter used for determining the Mobile Node's paging slot, as specified in Section 1.2. If time slot-based paging is not used, this field must be set to zero.

2.6 Paged Mobile Node Address Extension

Figure 9:
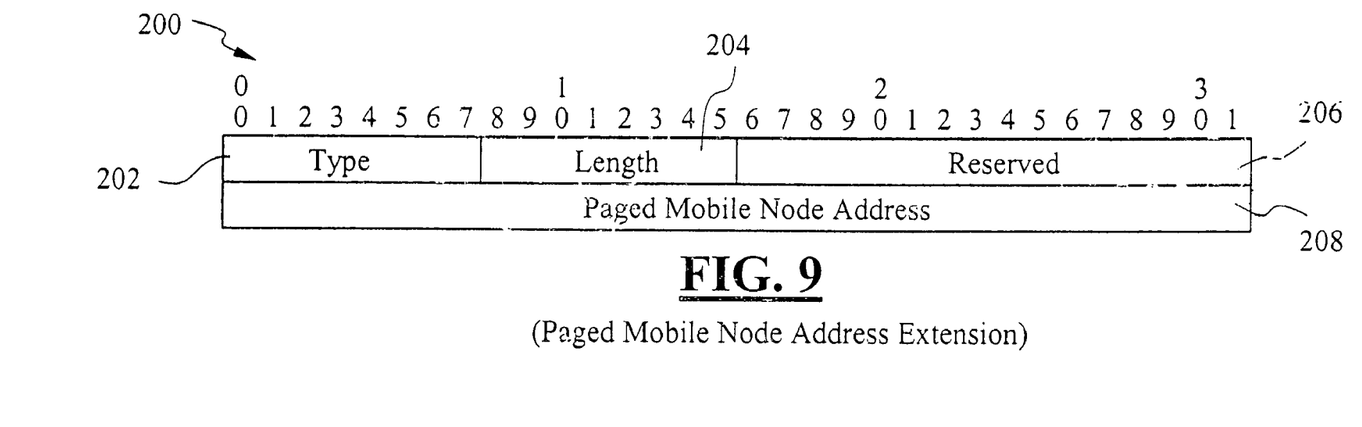
FIG. 9 is a diagram of a paged mobile node address extension sent from a paging foreign agent to a mobile node in FIG. 1 in order to identify the mobile node being paged.

FIG. 9 shows the Paged Mobile Node Address extension generally indicated as 200, which includes a Type field 202, a Length field 204, a Reserved field 206 and a Paged Mobile Node Address field 208.

The Paged Mobile Node Address extension 200 which is used for identifying the Mobile Node 14 that is paged with the paging Agent Advertisement. This allows several Mobile Nodes to share a Paging Multicast Address. This also allows several Mobile Nodes to share a Paging Multicast Address. The motivation for using an Agent advertisement for paging is that in order to return to the Active Mode by performing a regional registration, the Mobile Node needs an Agent Advertisement anyway.

The Length field 204 is the length of the fields excluding the Type and the Length fields, in octets.

The Reserved field 206 is unused. It must be initialized to zero by the sender and must be ignored by the receiver.

The Paged Mobile Node Addresses field 208 is the IP home address of the Mobile Node that is the target of paging. For efficiency reasons, there may be more than one Mobile Node address listed in this field.

3. IANA Considerations

The Internet Assigned Numbers Authority (IANA) is the central coordinator for the assignment of unique parameter values for internet protocols. Because the present invention specifies new mobile internet protocol messages and new extension types, new unique type numbers need to be assigned for them.

For example, the Mobile IP Regional Paging of the present invention requires a new Mobile IP Message type to be used for sending the Paging Request message to the UDP port 434 (see section 2.5 above).

The Mobile IP Regional Paging requires three new extension types to be used in combination with the Agent Advertisement: a skippable type for Advertisement Interval extension (Section 2.1), a skippable type for the Paging Area ID extension (Section 2.2), and a skippable type for the Paged Mobile Node Address Extension (Section 2.6).

The Mobile IP Regional Paging requires two new extension types to be used in combination with the Registration Request or Reply: a non-skippable type for the Idle Mode Request Extension and a non-skippable type for Idle Mode Reply Extension (Sections 2.3 and 2.4, respectively).

4. Security Considerations

The Mobile IP Regional Paging uses the same security mechanisms as regional registrations known in the art. More specifically, the Idle Mode registration is protected by the Mobile-Foreign Authentication extension using the same key distribution authentication and replay protection mechanisms as specified for the regional registrations. The Paging Request message is protected by the FA—FA intra-visited-domain Authentication extension known in the art. For IPv4, this can be the FA—FA Authentication extension, while for the IPv6, an IPv6 Authentication Header.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

We claim:

1. A mobile internet protocol regional paging network having a visited-domain mobility agent for handling a regional registration of a mobile node visiting a paging area,
the mobile node having an idle mode module for periodically providing an idle mode request to the visited-domain mobility agent containing information that the mobile node is entering an idle mode so as to deactivate one or more components for energy-saving purposes and reduce active communication with the mobile internet protocol regional paging network,
the mobile node negotiating a time slot based paging scheme with the visited-domain mobility agent.

2. A mobile internet protocol regional paging network according to claim 1, characterized in that
the time slot based paging scheme includes the exchange of information about time slots used for paging area advertisements by the visited-domain mobility agent, a message for the mobile node to deduce its current paging area, or a combination thereof.

3. A mobile internet protocol regional paging network according to claim 1, characterized in that
time instant are expressed in relation to a current time of day, if the mobile node and the visited-domain agent have accurate and synchronized time of day clocks.

4. A mobile internet protocol regional paging network according to claim 1, characterized in that
time instants are expressed in relation to some time instant that the mobile node and the visited-domain agent both know, including time instants when periodic paging area advertisements are broadcast.

5. A mobile internet protocol regional paging network according to claim 1, characterized in that
the idle mode request contains parameters for negotiating time slot based paging with the visited-domain mobility agent.

6. A mobile internet protocol regional paging network according to claim 5, characterized in that
one of the parameters is a paging slot interval parameter for time slot based paging support.

7. A mobile internet protocol regional paging network according to claim 1, characterized in that
the visited-domain mobility agent has an idle mode reply extension module that provides an idle mode reply containing parameters that can be used to determine a time instant when the mobile node expects to be paged.

8. A mobile internet protocol regional paging network according to claim 7, characterized in that
the parameters include a paging slot index parameter and a paging slot offset.

9. A mobile internet protocol regional paging network according to claim 1, characterized in that
the visited-domain mobility agent has a visitor list module that responds to the idle mode request, modifies its visitor list to include the mobile node and maintains a paging state for the mobile node as an idle mode.

10. A mobile internet protocol regional paging network according to claim 1, characterized in that
the mobile internet protocol regional paging network further comprises a leaf foreign agent for providing a paging area advertisement with a paging area ID extension containing information about the paging area the mobile node is visiting.

11. A mobile internet protocol regional paging network according to claim 10, characterized in that
the paging area advertisement contains an advertisement interval extension that specifies a time interval between subsequent paging area advertisements.

12. A mobile internet protocol regional paging network according to claim 1, characterized in that
the visited-domain mobility agent responds to a regional registration request from the mobile node and maintains the paging state for the mobile node as an active mode.

13. A mobile internet protocol regional paging network according to claim 1, characterized in that
the visited-domain mobility agent responds to a packet from a corresponding node addressed to the mobile node by requesting the visited-domain agent of the paging area to page the mobile node.

14. A mobile internet protocol regional paging network according to claim 1, characterized in that
the mobile node responds to a paging message containing an identifier of the mobile node and enters an active mode.

15. A mobile internet protocol regional paging network according to claim 1, characterized in that
the mobile node responds to a paging area advertisement having a paged mobile node address extension with a paging multicast address and enters an active mode.

16. A method for entering an idle mode in a mobile internet protocol regional paging network having a visited-domain mobility agent for handling a regional registration of a mobile node visiting a paging area, the mobile node having a plurality of components that consume energy when activated, characterized in that the method comprises the steps of:
- periodically providing with the mobile node an idle mode request to the visited-domain mobility agent containing information that the mobile node is entering an idle mode so as to deactivate one or more components of the mobile node for energy-saving purposes and reduce active communication with the mobile internet protocol regional paging network; and
- negotiating a time slot based paging scheme with the visited-domain mobility agent and agreeing on time slots used for paging area advertisements and paging within the paging area.

17. A method according to claim 16, characterized in that the method further comprises the steps of:
- responding with the visited-domain mobility agent to the idle mode request from the mobile node;
- modifying a visiting list to include the mobile node; and
- maintaining a paging state for the mobile node as an idle mode.

18. A mobile node for entering a mobile internet protocol regional paging network having a visited-domain mobility agent for handling a regional registration of the mobile node visiting a paging area, the mobile node comprising:
- an idle mode module for periodically providing an idle mode request to the visited-domain mobility agent containing information that the mobile node is entering an idle mode so as to deactivate one or more components for energy-saving purposes and reduce active communication with the mobile internet protocol regional paging network; and
- a time slot paging module for negotiating time slot based paging with the visited-domain mobility agent.

19. A mobile node according to claim 18, characterized in that
the time slot paging module negotiates a time slot based paging scheme with the visited-domain mobility agent and agrees on time slots used for paging area advertisements and paging within the paging area.

20. A mobile node according to claim 18, characterized in that
time instant are expressed in relation to a current time of day, if the mobile node and the visited-domain agent have accurate and synchronized time of day clocks.

21. A mobile node according to claim 18, characterized in that
time instants are expressed in relation to some time instant that the mobile node and the visited-domain agent both know, including a time instants when periodic paging area advertisements are broadcast.

22. A mobile node according to claim 18, characterized in that
the idle mode request contains parameters for negotiating time slot based paging with the visited-domain mobility agent.

23. A visited-domain mobility agent for handling a regional registration of a mobile node visiting a paging area in a mobile internet protocol regional paging network,
- the mobile node having an idle mode module for periodically providing an idle mode request to the visited-domain mobility agent containing information that the mobile node is entering an idle mode so as to deactivate one or more components for energy-saving purposes and reduce active communication with the mobile internet protocol regional paging network,
- the visited-domain mobility agent having an idle mode reply extension module for negotiating time slot based paging with a time slot paging module of the mobile node.

24. A visited-domain mobility agent according to claim 23, characterized in that
the visited-domain mobility agent negotiates a time slot based paging scheme with the mobile node and agrees on time slots used for paging area advertisements and paging within the paging area.

25. A visited-domain mobility agent according to claim 23, characterized in that
time instant are expressed in relation to a current time of day, if the mobile node and the visited-domain agent have accurate and synchronized time of day clocks.

26. A visited-domain mobility agent according to claim 23, characterized in that
time instants are expressed in relation to some time instant that the mobile node and the visited-domain agent both know, including time instants when periodic paging area advertisements are broadcast.

* * * * *